US008634092B2

(12) United States Patent
Ohara (10) Patent No.: US 8,634,092 B2
(45) Date of Patent: Jan. 21, 2014

(54) SERVER FOR RELAYING PRINT JOB (75) Inventor: Kiyotaka Ohara, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 224 days.

(21) Appl. No.: 13/173,609

(22) Filed: Jun. 30, 2011

(65) Prior Publication Data

US 2012/0026539 A1 Feb. 2, 2012

(30) Foreign Application Priority Data

Jul. 29, 2010 (JP) ................................. 2010-170995

(51) Int. Cl.
*G06F 15/00* (2006.01)
(52) U.S. Cl.
USPC ....................................................... 358/1.15
(58) Field of Classification Search
USPC ....................................................... 358/1.15
See application file for complete search history.

(56) References Cited

U.S. PATENT DOCUMENTS

| | | | |
|---|---|---|---|
| 2002/0042299 A1* | 4/2002 | Soltys et al. ................... | 463/29 |
| 2002/0044299 A1* | 4/2002 | Iwase et al. ................... | 358/1.15 |
| 2002/0147864 A1 | 10/2002 | Katada et al. | |

FOREIGN PATENT DOCUMENTS

| | | |
|---|---|---|
| JP | 2002-271549 | 9/2002 |
| JP | 2002-304269 | 10/2002 |
| JP | 2004-46681 | 2/2004 |
| JP | 2004-212683 | 7/2004 |

* cited by examiner

*Primary Examiner* — Saeid Ebrahimi Dehkordy
(74) *Attorney, Agent, or Firm* — Scully, Scott, Murphy & Presser, P.C.

(57) ABSTRACT

A first command receiving unit receives a first command from the printer when a user performs a first operation on the printer for executing printing. A printer recognizing unit recognizes the printer as a first printer that is waiting for a print job based on the first command. A file request receiving unit receives a file request from the terminal device. A first file transmitting unit transmits a first file to the terminal device when the file request receiving unit has received the file request. A first file is a file for displaying on the terminal device a printer specifying screen which includes printer identification information for identifying the first printer. A second command receiving unit receives a second command from the terminal device. A second command is transmitted from the terminal device when the first printer is specified on the printer specifying screen. A job transmitting unit transmits the print job to the first printer specified by the terminal device when the second command receiving unit has received the second command.

10 Claims, 8 Drawing Sheets

PRINTER SEARCH — 67

FIRST-BUILDING
SECOND-BUILDING
THIRD-BUILDING

FIG.5(b)

PRINTER SEARCH — 69

FIRST-FLOOR
SECOND-FLOOR
THIRD-FLOOR

FIG.5(c)

PRINTER SEARCH — 71

| NAME | MODEL |
|---|---|
| BR-12345 | H600 |
| BR-55400 | M300 |
| BR-66779 | C1200 |
| BR-91923 | C1200 |

FIG.5(d)

PRINTER SEARCH — 73

| NAME | MODEL |
|---|---|
| BR-12345 | H600 |
| BR-55400 | M300 |
| BR-66779 | C1200 |
| *BR-91923* | *C1200* |

PRINTER SEARCH — 83

| AICHI-PREFECTURE | BR-12345 H600 |
| | BR-1967 H600 |
| MIE-PREFECTURE | BR-33500 L450 |
| | BR-6789 L450 |
| GIFU-PREFECTURE | BR-9920 M300 |
| | BR-93478 M300 |
| | BR-9540 M300 |
| | BR-55400 M300 |
| | BR-8792 M300 |
| | BR-66779 C1200 |
| | BR-91923 C1200 |

FIG.8(b)

PRINTER SEARCH — 85

| NAGOYA-CITY | BR-12345 H600 |
| | BR-33500 L450 |
| | BR-9920 M300 |
| ICHINOMIYA-CITY | BR-9540 M300 |
| | BR-55400 M300 |
| KOMAKI-CITY | BR-66779 C1200 |
| | BR-8760 M300 |
| | BR-4589 M300 |
| | BR-31223 M300 |
| | BR-46780 H600 |

FIG.8(c)

PRINTER SEARCH — 87

| NAKA-WARD | BR-12345 H600 |
| | BR-55400 M300 |
| HIGASHI-WARD | BR-66779 C1200 |
| | BR-91923 C1200 |
| | BR-31223 M300 |
| MIZUHO-WARD | BR-46780 H600 |
| | BR-99617 H600 |

FIG.8(d)

PRINTER SEARCH — 89

| ○×-INDUSTRIES | BR-66779 C1200 |
| ××-INDUSTRIES | BR-91923 C1200 |
| ○○-ELECTRONICS | |

SERVER FOR RELAYING PRINT JOB

CROSS REFERENCE TO RELATED APPLICATION

This application claims priority from Japanese Patent Application No. 2010-170995 filed Jul. 29, 2010. The entire content of this priority application is incorporated herein by reference.

TECHNICAL FIELD

The present invention relates to a technology for executing printing by freely selecting an output destination on a network.

BACKGROUND

There has been an increasing demand for a technology for executing printing by freely selecting an output destination on a network, without the need for a printer driver installed. According to a technology disclosed in Japanese Patent Application Publication No. 2004-46681, for example, a terminal outputs an output request to a server. The output request includes identification information of a printer as an output destination and information indicating a location of contents. The printer accesses the server at regular intervals to obtain the output request issued to the printer. Then, the printer obtains the contents based on the information indicating the location of the contents, and executes printing. In this manner, a user of the terminal can execute printing with an arbitrary output destination.

SUMMARY

However, the above-described technology requires a user to specify a printer as an output destination by inputting identification information of the printer (printer ID, for example), which is troublesome for the user. Also, there is a danger that the user inputs incorrect identification information since identification information of printers are usually cumbersome.

In view of the foregoing, it is an object of the invention to provide a technology that enables a user to specify an output destination in a simple manner when executing printing by freely selecting the output destination on a network.

In order to attain the above and other objects, the invention provides a server communicable with both a terminal device and a printer. The server includes a first command receiving unit, a printer recognizing unit, a file request receiving unit, a first file transmitting unit, a second command receiving unit, and a job transmitting unit. The first command receiving unit receives a first command from the printer when a user performs a first operation on the printer for executing printing. The printer recognizing unit recognizes the printer as a first printer that is waiting for a print job based on the first command. The first command indicates that the printer is waiting for a print job. The file request receiving unit receives a file request from the terminal device. The first file transmitting unit transmits a first file to the terminal device when the file request receiving unit has received the file request. The first file is a file for displaying on the terminal device a printer specifying screen which includes printer identification information for identifying the first printer. The second command receiving unit receives a second command from the terminal device. The second command is transmitted from the terminal device when the first printer is specified on the printer specifying screen. The job transmitting unit transmits the print job to the first printer specified by the terminal device when the second command receiving unit has received the second command.

According to another aspect, the present invention provides a non-transitory computer readable storage medium storing a set of program instructions installed on and executed by a server communicable with both a terminal device and a printer. The set of program instructions includes: receiving a first command from the printer when a user performs a first operation on the printer for executing printing; recognizing the printer as a first printer that is waiting for a print job based on the first command, the first command indicating that the printer is waiting for a print job; receiving a file request from the terminal device; transmitting a first file to the terminal device when the file request the file request has been received, the first file being a file for displaying on the terminal device a printer specifying screen which includes printer identification information for identifying the first printer; receiving a second command from the terminal device, the second command being transmitted from the terminal device when the first printer is specified on the printer specifying screen; and transmitting the print job to the first printer specified by the terminal device when the second command has been received.

According to another aspect, the present invention provides a printing system including: a printer including a first command transmitting unit and a job receiving unit; a terminal device including a file request transmitting unit, a file receiving unit, and a second command transmitting unit; and a server communicable with both the terminal device and the printer, and including a first command receiving unit, a printer recognizing unit, a file request receiving unit, a first file transmitting unit, a second command receiving unit, and a job transmitting unit. The first command transmitting unit transmits a first command to the server when a user performs a first operation on the printer for executing printing. The first command indicates that the printer is waiting for a print job. The first command receiving unit receives the first command from the printer. The printer recognizing unit recognizes the printer as a first printer that is waiting for a print job based on the first command. The file request transmitting unit transmits a file request to the printer. The file request receiving unit receives the file request from the terminal device. The first file transmitting unit transmits a first file to the terminal device when the file request receiving unit has received the file request. The first file is a file for displaying on the terminal device a printer specifying screen which includes printer identification information for identifying the first printer. The file receiving unit receives the first file. The terminal device displays the printer specifying screen based on the first file. The second command transmitting unit transmits a second command to the server when the first printer is specified on the printer specifying screen. The second command receiving unit receives the second command from the terminal device. The job transmitting unit transmits the print job to the first printer specified by the terminal device when the second command receiving unit has received the second command. The job receiving unit receives the print job from the server.

BRIEF DESCRIPTION OF THE DRAWINGS

The particular features and advantages of the invention as well as other objects will become apparent from the following description taken in connection with the accompanying drawings, in which.

DETAILED DESCRIPTION

Embodiments of the invention will be described while referring to the accompanying drawings wherein like parts and components are designated by the same reference numerals to avoid duplicating description.

A. First Embodiment

A-1. Structure of Printing System

Figure 1:
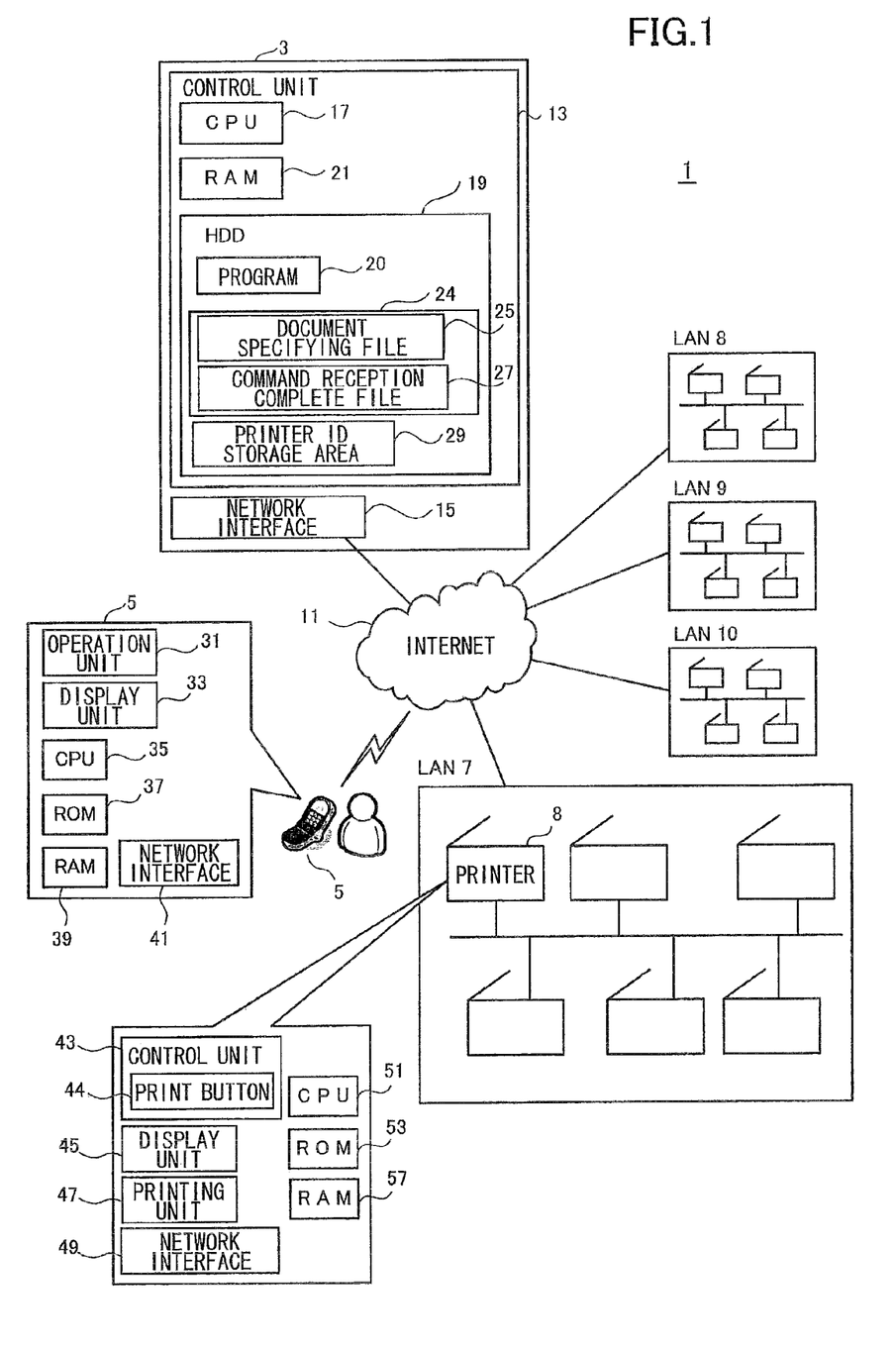
FIG. 1 is an explanatory diagram showing configurations of a printing system, a relay server, a mobile terminal, and a printer according to embodiments of the invention.

A first embodiment of the invention will be described with reference to the accompanying drawings. As shown in FIG. 1, a printing system 1 includes a relay server 3, a mobile terminal 5, LANs 7, 8, 9, and 10, and Internet 11.

Each of the LANs 7-10 includes a plurality of printers. The relay server 3, the mobile terminal 5, and the printers included in the LANs 7-10 are all communicable with one another via the Internet 11.

Although the mobile terminal 5 and the printers included in the LANs 7-10 are communicable with one another via the Internet 11, the mobile terminal 5 does not send document data to be printed to the printers directly, but sends to the relay server 3. As will be described later in greater detail, this is because the printers cannot interpret the document data sent from the mobile terminal 5. Upon receiving the document data, the relay server 3 converts the document data into data that the printers can interpret.

A-2. Structure of Relay Server 3

The relay server 3 includes a control unit 13 and a network interface 15. The control unit 13 includes a CPU 17, a HDD 19, and a RAM 21.

The CPU 17 performs overall control of all components in the relay server 3. The HDD 19 stores a program 20. The CPU 17 performs processes to be described later by executing the program 20.

The HDD 19 includes a file storage area 24 and a printer ID storage area 29. The file storage area 24 stores a document specifying file 25 (described later) and a command reception complete file 27 (described later). The printer ID storage area 29 stores printer IDs of all the printers connected to the Internet 11 (i.e., all the printers included in LANs 7-10), in association with location information of the printers.

The location information of the printers denotes names of prefectures, cities, and municipalities where the printers are located; names of companies at which the printers are located; names of buildings in which the printers are located; and floors on which the printers are located. The printer IDs and the location information are stored in a hierarchical structure. That is, the city names are stored one level below the prefecture names; the municipality names are stored one level below the city names; the company names are stored one level below the municipality names; the building names are stored one level below the company names; the floors are stored one level below the building names, and the printer IDs are stored one level below the floors on which the printers are located. When any printer is in a print job standby state, then information indicating that the printer is in the print job standby state (hereinafter referred to as "print job standby information") is stored in association with a printer ID of this printer. Details will be described later.

The RAM 21 is used as a storage area for storing data that is created when the CPU 17 executes various, processes and as a storage area used by the CPU 17 when the CPU 17 performs various processes. The network interface 15 is an interface for connecting the relay server 3 to the Internet 11.

A-3. Structure of Mobile Terminal 5

The mobile terminal 5 includes an operation unit 31, a display unit 33, a CPU 35, a ROM 37, a RAM 39, and a network interface 41.

The operation unit 31 includes operation keys. By operating the operation unit 31, a user can input an instruction for the mobile terminal 5 to execute various processes. The display unit 33 is a display for displaying various information. The CPU 35 performs overall control of all components in the mobile terminal 5.

The ROM 37 stores programs (not shown). The CPU 35 performs processes to be described later by executing the programs stored in the ROM 37. The RAM 39 is used as a storage area for storing data that is created when the CPU 35 executes various processes and as a storage area used by the CPU 35 when the CPU 35 performs various processes. The network interface 41 is an interface for connecting the mobile terminal 5 to the Internet 11.

A-4. Structure of Printer 8

The structure of a printer 8 included in the LAN 7 will be described. Note that other printers included in the LAN 7 and the printers included in the LANs 8-10 have the same structure as the printer 8.

The printer 8 includes an operation unit 43, a display unit 45, a printing unit 47, a network I/F 49, a CPU 51, a ROM 53, and a RAM 57.

The operation unit 43 includes a print button 44 and other operation keys. By operating the operation unit 43, the user can input an instruction for the printer 8 to execute various operations. The display unit 45 is a display for displaying various information. The printing unit 47 performs printing based on print commands. The network interface 49 is an interface for connecting the printer 8 to the Internet 11.

The CPU 51 performs overall control of all components in the printer 8. The ROM 53 stores programs (not shown). The CPU 51 performs processes to be described later by executing the programs stored in the ROM 53. The RAM 57 is used as a storage area for storing data that is created when the CPU 51 executes various processes and as a storage area used by the CPU 51 when the CPU 51 performs various processes.

A-5. Processes Executed by Each Device

Next, processes executed by each device in the printing system 1 will be described with reference to FIGS. 2 to 6(*b*). A process executed when a user of the mobile terminal 5 instructs the printer 8 in the LAN 7 to perform printing will be described herein.

Figure 2:
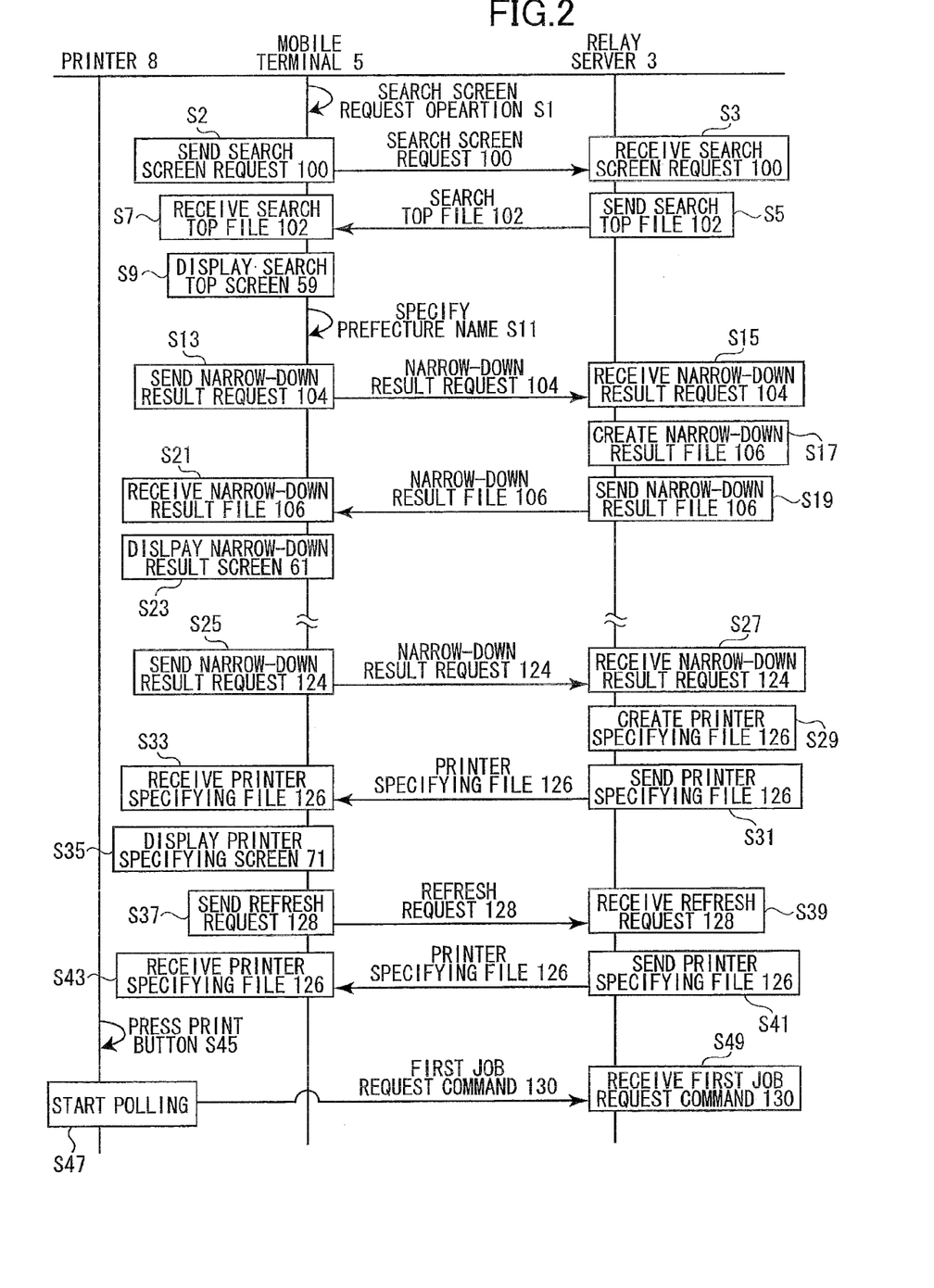
FIG. 2 is a sequence diagram showing processes in each device according to a first embodiment of the invention.

First, a narrow-down process is executed for narrowing down candidates for the printer ID of the printer 8 as the user of the printer 5 (hereinafter referred to as "user") sequentially specifies the location information of the printer 8 by operating the operation unit 31.

The narrow-down process will be described.

First, the user performs a search screen request operation (S1). The search screen request operation is an operation for requesting a search TOP screen (described later) that the user performs at the beginning of printer search.

Figure 4A:
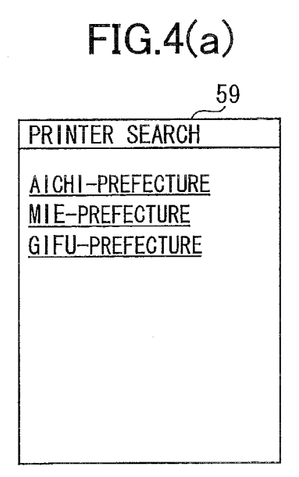
FIG. 4(a) is an explanatory diagram showing an example of search TOP screen displayed on the mobile terminal according to the first embodiment of the invention.

When the user performs the search screen request operation, the mobile terminal 5 sends a search screen request 100 to the relay server 3 (S2). Upon receiving the search screen request 100 (S3), the relay server 3 sends a search TOP file 102 to the mobile terminal 5 (S5). Although not shown in the drawings, the search TOP file 102 is stored in the HDD 19. The search TOP file 102 is an HTML file for displaying a search TOP screen 59. FIG. 4(*a*) shows the search TOP screen 59.

The mobile terminal 5 receives the search TOP file 102 (S7). Then, the mobile terminal 5 displays the search TOP screen 59 on the display unit 33 based on the search TOP file 102 (S9).

When the user specifies a prefecture name (S11), the mobile terminal 5 sends a narrow-down result request 104 to the relay server 3 (S13). The narrow-down result request 104 includes prefecture-name information indicating the prefecture name that the user has specified.

Figure 4B:
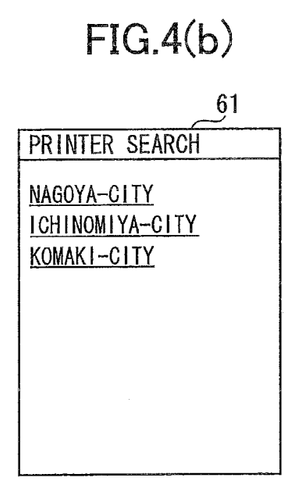
FIGS. 4(b) to 4(d) are explanatory diagrams each showing an example of narrow-down result screen displayed on the mobile terminal according to the first embodiment of the invention.

The relay server 3 receives the narrow-down result request 104 (S15). Next, the relay server 3 specifies city names located one level below the prefecture name corresponding to the prefecture-name information included in the narrow-down result request 104 from among those stored in the printer ID storage area 29, and creates a narrow-down result file 106 (S17). The narrow-down result file 106 is an HTML file for displaying a narrow-down result screen 61 that shows a list of the city names located one level below the prefecture name specified by the user. FIG. 4(*b*) shows an example of the narrow-down result screen 61.

Subsequently, the relay server 3 sends the narrow-down result file 106 to the mobile terminal 5 (S19).

The mobile terminal 5 receives the narrow-down result file 106 from the relay server 3 (S21), and then displays the narrow-down result screen 61 on the display unit 33 based on the narrow-down result file 106 (S23).

Figure 4C:
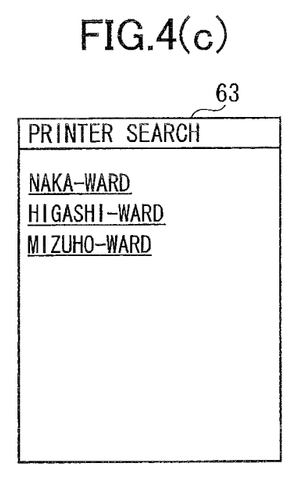

Although not shown in the drawings, if the user specifies a city name in the same manner, then the mobile terminal 5 receives an HTML file created for displaying a narrow-down result screen 63 that shows a list of municipality names located one level below the specified city name, and displays the narrow-down result screen 63. FIG. 4(*c*) shows an example of the narrow-down result screen 63.

Figure 4D:
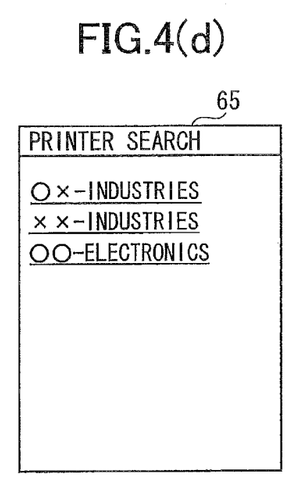

Similarly, if the user specifies a municipality name, then the mobile terminal 5 receives an HTML file created for displaying a narrow-down result screen 65 that shows a list of company names located one level below the specified municipality name, and displays the narrow-down result screen 65. FIG. 4(*d*) shows an example of the narrow-down result screen 65.

Figure 5A:
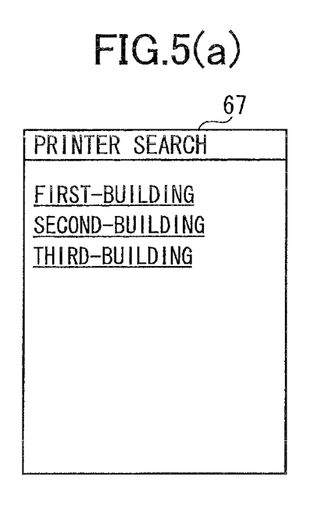
FIGS. 5(a) and 5(b) are explanatory diagrams each showing an example of narrow-down result screen displayed on the mobile terminal according to the first embodiment of the invention.

Similarly, if the user specifies a company name, then the mobile terminal 5 receives an HTML file created for displaying a narrow-down result screen 67 that shows a list of building names located one level below the specified company name, and displays the narrow-down result screen 67. FIG. 5(*a*) shows an example of the narrow-down result screen 67.

Figure 5B:
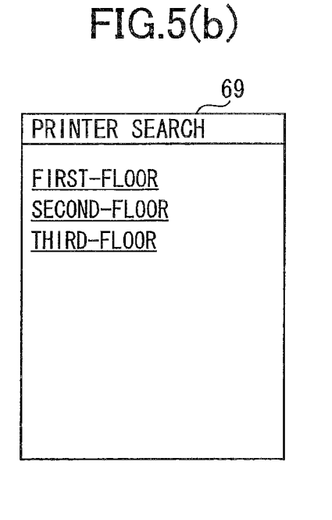

Similarly, if the user specifies a building name, then the mobile terminal 5 receives an HTML file created for displaying a narrow-down result screen 69 that shows a list of floors located one level below the specified building name, and displays the narrow-down result screen 69. FIG. 5(*b*) shows an example of the narrow-down result screen 69.

Then, if the user specifies a floor, then the mobile terminal 5 sends a narrow-down result request 124 including floor information indicating the specified floor to the relay server 3 (S25). The relay server 3 receives the narrow-down result request 124 from the mobile terminal 5 (S27).

Next, the relay server 3 determines printer IDs located one level below the specified floor based on the floor information included in the narrow-down result request 124, and also determines whether or not the print job standby information is stored in association with each of the determined printer IDs.

The print job standby information will be described in detail. Each printer in the printing system 1 starts polling (S47 described later) when the user presses the print button of the printer. The term "polling" denotes a process in which the printer repeatedly sends a request for a print job to the relay server 3 at prescribed time intervals. When the polling is started, the printer keeps sending a first job request command 130 including a printer ID of its own to the relay server 3 at prescribed intervals during a prescribed time period until any print job is received.

Upon receiving the first job request command 130 from the mobile terminal 5, the relay server 3 determines that the printer corresponding to the printer ID included in the first job request command 130 is in the print job standby state, and associates this printer ID in the printer ID storage area 29 with the print job standby information.

For example, if the user presses the print button 44 of the printer 8 while the narrow-down process is being executed (more specifically, during the processes of S1 to S23), then the printer ID of the printer 8 is already associated with the print job standby information at the time of when the relay server 3 receives the narrow-down result request 124 from the mobile terminal 5 (S27).

Note that after sending a print job to the printer 8 in response to the first job request command 130, the relay server 3 deletes the print job standby information stored in association with the printer ID included in the first job request command 130. The relay server 3 repeatedly receives the first job request command 130 from the printer at prescribed time intervals. If a prescribed time interval has elapsed after the relay server 3 has received the first job request command 130 without a subsequent first job request command 130 is received, then the relay server 3 determines that the polling is complete, and deletes the print job standby information stored in association with the printer ID included in the first job request command 130.

Referring back to FIG. 2, after determining printer IDs located one level below the specified floor and after determining whether or not each of the determined printer IDs is associated with the print job standby information, the relay server 3 creates a printer specifying file 126 (S29).

Specifically, the relay server 3 creates the printer specifying file 126 for displaying a printer specifying screen that shows a list of the printer IDs determined to be located one level below the specified floor. In particular, the printer specifying file 126 is created such that the printer IDs associated with the print job standby information are displayed in the italic font (highlighted font), whereas the printer IDs not associated with the print job standby information are displayed in the normal font (normal display). If the relay server 3 has determined that none of the printer IDs are associated with the print job standby information, on the other hand, then the printer specifying file 126 is created such that all the printer IDs are displayed in the normal font.

Figure 5C:
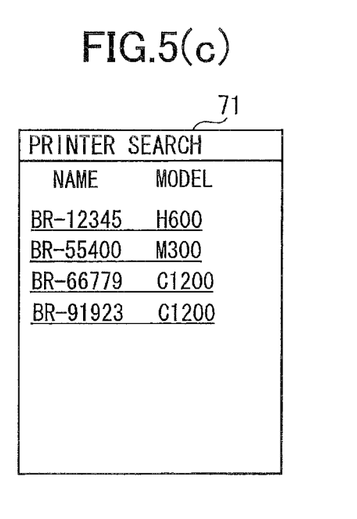
FIGS. 5(c) and 5(d) are explanatory diagrams each showing an example of printer specifying screen displayed on the mobile terminal according to the first embodiment of the invention.

In the following description, it is assumed that the user presses the print button 44 of the printer 8 after the narrow-down process (S1-35) is complete. It is also assumed that all the printers in the printing system 1 are not in the print job standby state. In this case, the relay server 3 creates the printer specifying file 126 for displaying a printer specifying screen 71 that shows all the printers determined to be located one level below the specified floor in the normal display. FIG. 5(c) shows an example of the printer specifying screen 71.

Next, the relay server 3 sends the printer specifying file 126 to the mobile terminal 5 (S31).

The mobile terminal 5 receives the printer specifying file 126 from the relay server 3 (S33). Then, the mobile terminal 5 displays the printer specifying screen 71 on the display unit 33 based on the printer specifying file 126 (S35). This completes the narrow-down process.

The printer specifying file 126 includes an automatic refresh command that repeatedly instructs update of the printer specifying screen 71 until a printer ID is transmitted from the mobile terminal 5 to the relay server 3 after the user specifies a printer (described later).

The mobile terminal 5 sends a refresh request 128 to the relay server 3 in accordance with the automatic refresh command included in the printer specifying file 126 (S37).

The relay server 3 receives the refresh request 128 (S39). In accordance with the refresh request 128, the relay server 3 determines whether or not any of the printer IDs listed on the printer specifying screen 71 is associated with the print job standby information. Because the print button 44 of the printer 8 is not yet pressed in this example, the printer 8 has not yet started the polling at this time. Accordingly, the relay server 3 has not determined that the printer 8 is in the print job standby state, so the printer ID of the printer 8 is not associated with the print job standby information. Hence, in this example, the relay server 3 once again sends the printer specifying file 126 to the relay server 3 (S41).

The mobile terminal 5 receives the printer specifying file 126 once again (S43). Then, the mobile terminal 5 displays the printer specifying screen 71 based on the printer specifying file 126 again (not shown). Thereafter, the mobile terminal 5 once again sends the refresh request 128 to the relay server 3 in accordance with the automatic refresh command included in the printer specifying file 126 (S51 in FIG. 3). The mobile terminal 5 repeats this automatic refresh operation until the user specifies a printer after the printer specifying screen 71 is switched to a printer specifying screen 73 (described later).

After the narrow-down process is complete (S35), the user presses the print button 44 of the printer 8 (S45). When the print button 44 is pressed, the printer 8 starts the polling (S47). Note that the first job request command 130 includes the printer ID of the printer 8.

The relay server 3 receives the first job request command 130 from the printer 8 (S49). Upon receiving the first job request command 130, the relay server 3 determines the printer ID included in the first job request command 130, and stores the print job standby information in association with the printer ID of the printer 8 stored in the printer ID storage area 29.

Figure 3:
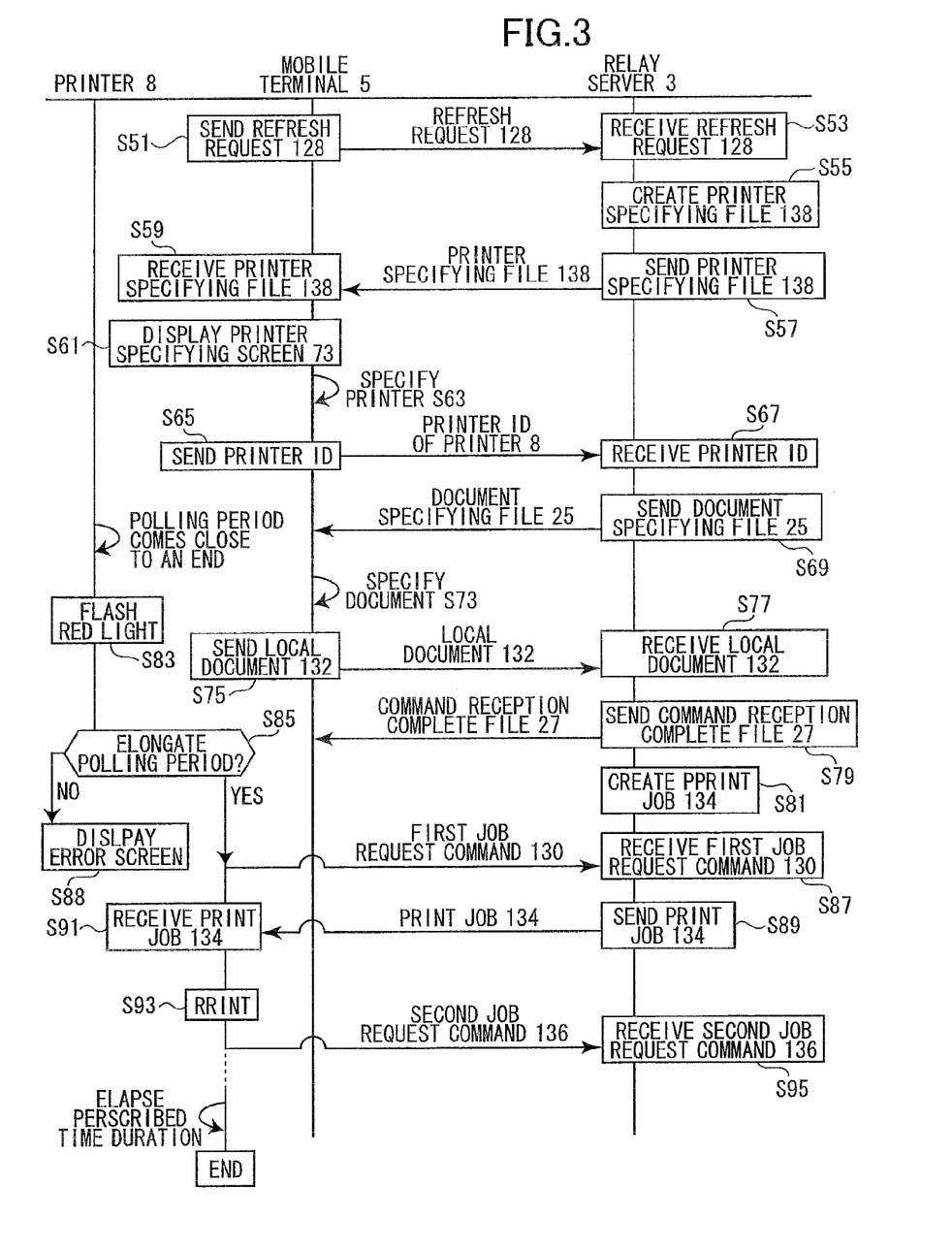
FIG. 3 is a sequence diagram showing processes in each device according to the first embodiment of the invention.

Description will be continued with reference to FIG. 3. The mobile terminal 5 sends the refresh request 128 to the mobile terminal 5 (S51).

The relay server 3 receives the refresh request 128 from the mobile terminal 5 (S53). In accordance with the refresh request 128, the relay server 3 determines whether or not any of the printer IDs to be listed on the printer specifying screen 71 is associated with the print job standby information. Here, the relay server 3 has already stored the print job standby information in association with the printer ID of the printer 8 (first type of printer) in the preceding process of S49, in this example. Hence, the relay server 3 creates a new printer specifying file 138 (S55).

Figure 5D:
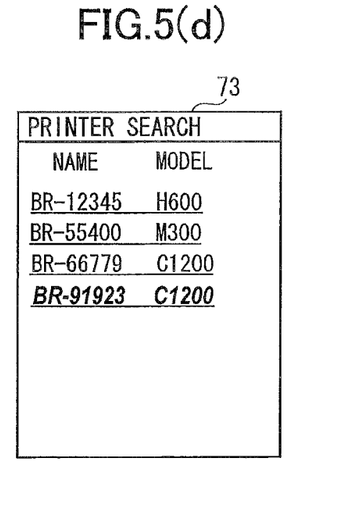

More specifically, the relay server 3 creates the printer specifying file 138 for displaying a new printer specifying screen 73 that lists the printer ID associated with the print job standby information and included in the printer IDs listed on the printer specifying screen 71, i.e., the printer ID of the printer 8, in the italic font (highlighted font). FIG. 5(d) shows an example of the printer specifying screen 73.

After creating the printer specifying file 138, the relay server 3 sends the printer specifying file 138 to the mobile terminal 5 (S57).

The mobile terminal 5 receives the printer specifying file 138 from the relay server 3 (S59). In accordance with the printer specifying file 138, the mobile terminal 5 displays the printer specifying screen 73 (S61).

As described above, the printer specifying screen 73 highlights the printer ID of the printer 8 having the print button 44 pressed by the user. Hence, the user can easily identify the printer ID of the printer that the user wants to use for printing from the list.

Note that the printer specifying file 138 includes the automatic refresh command that instructs the update of the printer specifying screen 73. This configuration can solve the following problems. Namely, it is possible that when a user wants to print with the printer 8, another user located near the user wants to print with another printer. In this case, the printer specifying screen 73 displayed on the mobile terminal 5 highlights a plurality of printer IDs. However, after the relay server 3 sends a print job to the another printer, the print job standby information associated with the printer ID of the another printer is deleted, so the updated printer specifying screen 73 displays the printer ID of the another printer in the normal font. Thus, the user can easily identify the printer ID of the printer 8.

Referring back to FIG. 3, the user specifies the printer ID displayed in the italic font (highlighted font) (S63). After specified, the printer ID is sent to the relay server 3 (S65).

It should be noted that information sent in S65 is not limited to the printer ID, provided that the information is specific information based on which the relay server 3 can identify a printer specified by the user. More specifically, the printer specifying file 138 includes a command for instructing the mobile terminal 5 to send the specific information when a printer ID is specified. The specific information differs for each printer ID. The relay server 3 recognizes the printer specified by the user based on the specific information received from the mobile terminal 5.

The relay server 3 receives the printer ID from the mobile terminal 5 (S67). In this example, it is assumed that the user has specified the printer ID of the printer 8.

Figure 6A:
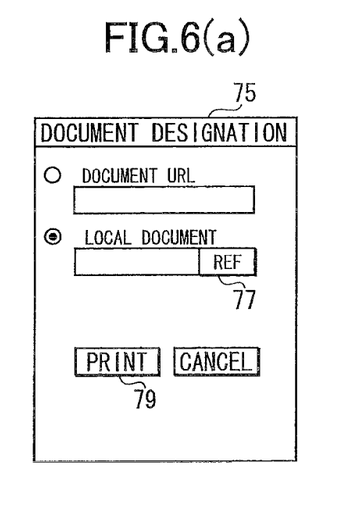
FIG. 6(a) is an explanatory diagram showing an example of document specifying screen displayed on the mobile terminal according to the first embodiment of the invention.

Next, the relay server 3 sends the document specifying file 25 stored in the HDD 19 to the mobile terminal 5 (S69). The document specifying file 25 is an HTML file for displaying a document specifying screen (document designation screen) 75 which enables the user to specify a document to be printed with the printer corresponding to the printer ID received in S67 (the printer 8, in this example). FIG. 6(*a*) shows an example of the document specifying screen 75.

The mobile terminal 5 receives the document specifying file 25 from the relay server 3 (not shown in FIG. 3). Then, the mobile terminal 5 displays the document specifying screen 75 based on the document specifying file 25 (not shown in FIG. 3).

The user specifies the document to be printed on the document specifying screen 75 (S73). More specifically, if the user wishes to print a document prestored on the relay server 3 or any other server within the printing system 1 (not shown), then the user specifies a URL of the document. However, if the user wishes to print a local document stored on the mobile terminal 5, then the user selects a reference button 77 on the document specifying screen 75, searches for the local document, and then specifies the same. When the user selects a print button 79, a process for specifying a document is complete (S73).

In the following description, it is assumed that the user has specified a local document 132 in S73.

The mobile terminal 5 sends the local document 132 to the relay server 3 (S75).

The relay server 3 receives the local document 132 from the mobile terminal 5 (S77). The relay server 3 stores both the printer ID of the printer 8 received in S67 and the local document 132 received in S77 in association with each other.

Figure 6B:
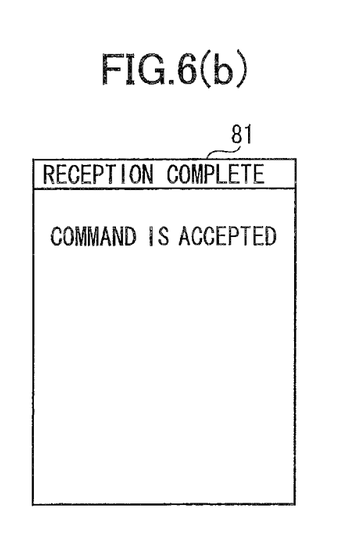
FIG. 6(b) is an explanatory diagram showing an example of print reception complete screen displayed on the mobile terminal according to the first embodiment of the invention.

Next, the relay server 3 sends the command reception complete file 27 stored in the HDD 19 to the mobile terminal 5 (S79). The command reception complete file 27 is an HTML file for displaying a print reception complete screen 81, which displays a message "command is accepted." FIG. 6(*b*) shows an example of the print reception complete screen 81.

The mobile terminal 5 receives the print command reception complete file 27 from the relay server 3 and displays the print reception complete screen 77 (not shown in FIG. 3).

Then, the relay server 3 creates a print job 134 by converting the local document 132 received in S77 into a PDL format that the printer 8 can print (S81). In this embodiment, the term "document" denotes data in a format that the printers cannot interpret, and the term "print job" denotes data in a PDL format that the printers can interpret.

The printer 8 has started the polling (S47 in FIG. 2). When the prescribed time period, which is a polling period (first time period), comes close to an end, the printer 8 notifies the user of this state by flashing red light on the display unit 45 (S83).

When the user presses the print button 44 again, then the printer 8 determines that an operation for elongating the polling period has been performed (S85:Yes), and continues to send the first job request command 130 for a predetermined time period even after the polling period has elapsed.

The relay server 3 continues to send the first job request command 130 even after the prescribed time period (polling period) has elapsed (S87).

If the user does not press the print button 44 again, on the other hand, then the printer 8 determines that the operation for elongating the polling period has not been performed (S85: No). In this case, when the polling period elapses, the printer 8 stops sending the first job request command 130 and controls the display unit 45 to display an error screen indicating that no print job is received (S88). Then, the printer 8 ends the process. In this case, the relay server 3 no longer receives the first job request command 130 from the printer 8, so the relay server 3 deletes the print job standby information associated with the printer ID of the printer 8 that is stored in the printer ID storage area 29.

Referring back to S87, upon reception of the first job request command 130, the relay server 3 sends the print job 134 corresponding to the printer ID included in the first job request command 130 to the printer 8 (S89). After sending the print job 134 to the printer 8, the relay server 3 deletes the print job standby information associated with the printer ID of the printer 8 that is stored in the printer ID storage area 29.

The printer 8 receives the print job 134 (S91) and executes printing based on the print job 134 (S93).

Next, the printer 8 sends a second job request command 136 to the relay server 3. The relay server 3 receives the second job request command 136 from the printer 8 (S95). The second job request command 136 is a command for requesting another print job from the relay server 3 after the printer 8 has executed the printing. The printer 8 outputs the second job request command 136 to the relay server 3 even after executing the printing. Hence, even when the user has specified a plurality of documents on the document specifying screen 75, the printer 8 can reliably receive all the documents. This enables the printer 8 to reliably print all the documents specified by the user.

If the printer 8 does not receive any print job for a prescribed time duration after sending the second job request command 136, the printer 8 determines that all print jobs have been received, and ends the process.

On the other hand, if the printer 8 receives a print job from the relay server 3 before the prescribed time duration elapses after sending the second job request command 136, then the printer 8 once again sends the second job request command 136 to the relay server 3 (not shown in FIG. 3). The printer 8 keeps sending the second job request command 136 until the printer 8 no longer receives a print job within the prescribed time duration after sending the second job request command 136. In other words, the relay server 3 keeps receiving the second job request command 136 until the printer 8 no longer receives a print job within the prescribed time duration after sending the second job request command 136.

The above description has been provided assuming that the user has specified the local document 132 in S73. A brief description will be provided below for a case where the user specifies a URL for a document in the document specifying screen 75.

When the user specifies a URL for a document (S73), then the specified URL is sent to the relay server 3. Upon receiving the URL, the relay server 3 obtains the document based on the URL. Then, the relay server 3 creates a print job by converting the obtained document to a PDL format. Next, the relay server 3 sends the print job to the printer 8 based on the first job request command 130.

In this manner, the user can specify a desired printer even when printing a document stored on the network.

B. Second Embodiment

Figure 7:
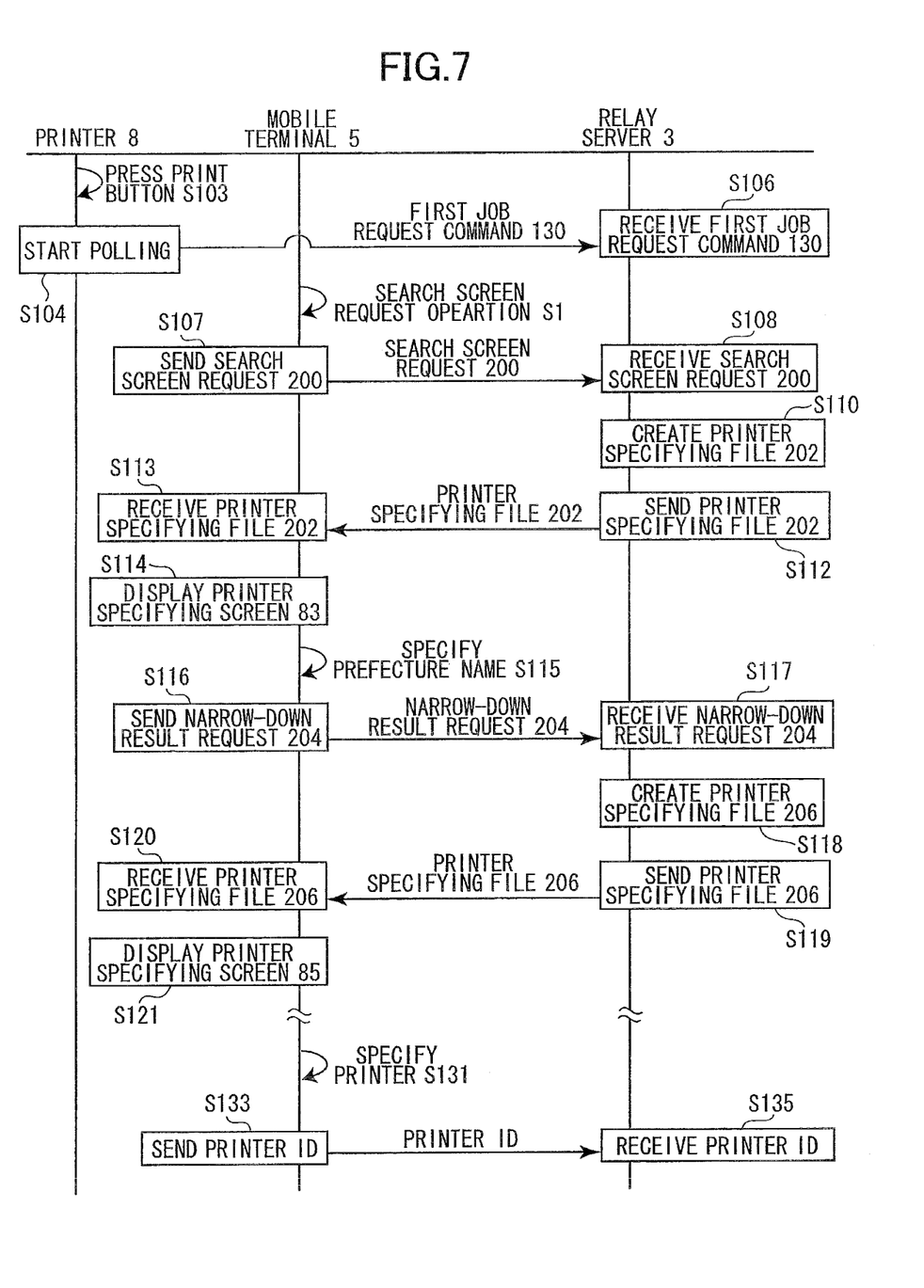
FIG. 7 is a sequence diagram showing processes in each device according to a second embodiment of the invention.

Next, a second embodiment will be described with reference to FIGS. 7 to 8(d). The second embodiment differs from the first embodiment in screens displayed on the mobile terminal 5. The following description will focus on those different from the first embodiment. In this embodiment also, it is assumed that the user of the mobile terminal 5 (hereinafter referred to as "user") executes printing with the printer 8.

Like the first embodiment, after receiving a first job request command from a printer in the printing system 1, the relay server 3 determines that the printer is in the print job standby state, and stores the print job standby information in association with a printer ID of the printer. After sending a print job to the printer in response to the first job request command, the relay server 3 deletes the print job standby information associated with the printer ID of the printer. If the relay server 3 does not receive a subsequent first job request command even after a predetermined time duration elapses after the reception of a preceding first job request command, then the relay server 3 determines that the polling is complete in the printer, and deletes the print job standby information associated with the printer ID of the printer.

First, the user presses the print button 44 of the printer 8 (S103). Then, the printer 8 starts the polling (S104). After starting the polling, the printer 8 sends the first job request command 130 to the relay server 3. The relay server 3 receives the first job request command 130 (S106). Note that after starting the polling, the printer 8 keeps sending the first job request command 130 to the relay server 3 at prescribed intervals during a prescribed time period until a print job is received.

Upon receiving the first job request command 130 from the printer 8, the relay server 3 determines that the printer 8 is in the print job standby state. Hence, the relay server 3 stores the print job standby information in association with the printer ID of the printer 8.

Then, the user operates the operation unit 31 to instruct the mobile terminal 5 to send a search screen request 200 to the relay server 3 (S107). The relay server 3 receives the search screen request 200 (S108).

Figure 8A:
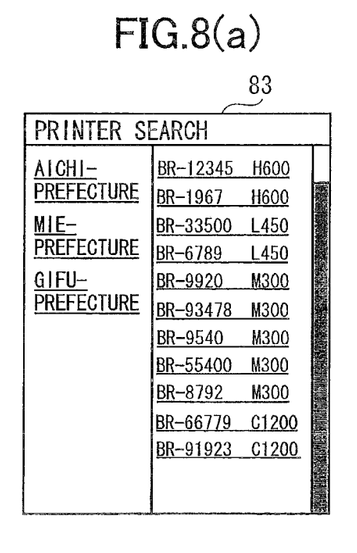
FIGS. 8(a) to 8(d) are explanatory diagrams each showing an example of printer specifying screen displayed on a mobile terminal according to the second embodiment of the invention.

Upon receiving the search screen request 200, the relay server 3 creates a printer specifying file 202 (S110). More specifically, first the relay server 3 identifies printer IDs associated with the print job standby information from among the printer IDs stored in the printer ID storage area 29 as of receiving the search screen request 200. Then, the relay server 3 creates the printer specifying file 202 for displaying a printer specifying screen 83, which shows a list of the identified printer IDs and the location information in the highest level (prefecture names) as elements for narrowing down the printer IDs (S110). FIG. 8(a) shows an example of the printer specifying screen 83.

Next, the relay server 3 sends the printer specifying file 202 to the mobile terminal 5 (S112). The mobile terminal 5 receives the printer specifying file 202 (S113), and displays the printer specifying screen 83 (S114).

Note that as of receiving the search screen request 200, the relay server 3 stores the printer ID of the printer 8 in association with the print job standby information. Hence, the printer ID of the printer 8 is included in the printer ID list on the printer specifying screen 83.

The user narrows down to the printer ID of the printer 8 by specifying the location information of the printer 8 in order.

A narrow-down process will be described next.

The user operates the operation unit 31 to specify a prefecture name (S115). Then, the mobile terminal 5 sends a narrow-down result request 204 to the relay server 3 (S116). The relay server 3 receives the narrow-down result request 204 (S117). The narrow-down result request 204 includes prefecture information that identifies the prefecture specified by the user.

Figure 8B:
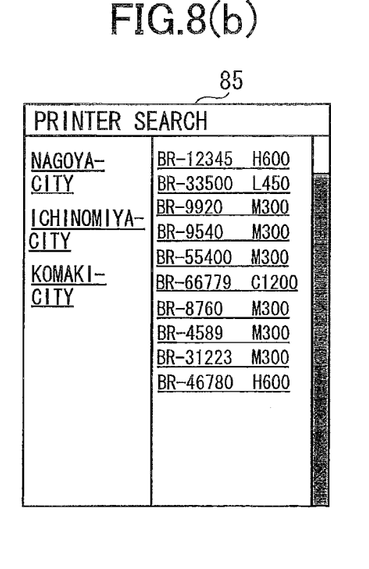

Upon receiving the narrow-down result request 204, the relay server 3 creates a printer specifying file 206 (S118). Specifically, the relay server 3 identifies printer IDs associated with the print job standby information from among the printer IDs of the printers located in the prefecture corresponding to the prefecture information included in the narrow-down result request 204. Then, the relay server 3 creates the printer specifying file 206 for displaying a printer specifying screen 85 that shows a list of the identified printer IDs together with city names, which are location information located one level below the prefecture name corresponding to the prefecture information included in the narrow-down result request 204, as elements for narrowing down the printer IDs (S118). FIG. 8(b) shows an example of the printer specifying screen 85.

Next, the relay server 3 sends the printer specifying file 206 to the mobile terminal 5 (S119). The mobile terminal 5 receives the printer specifying file 206 (S120), and displays the printer specifying screen 85 (S121).

Figure 8C:
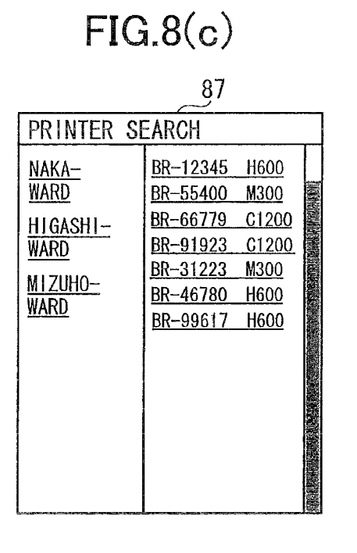

Although not shown in the drawings, if the user specifies a city name in the same manner, then the mobile terminal 5 displays a printer specifying screen 87 that shows a list of the printer IDs of the printers in the print job standby state among the printers located in the specified city. The printer specifying screen 87 also shows names of municipalities located in the city that the user has specified, as elements for narrow-down. FIG. 8(c) shows an example of the printer specifying screen 87.

Similarly, if the user specifies a municipality name, then the mobile terminal 5 displays a printer specifying screen 89 that shows a list of the printer IDs of the printers in the print job standby state among the printers located in the specified municipality. The printer specifying screen 89 also shows the names of the companies located in the municipality that the user has specified, as elements for narrow-down. FIG. 8(d) shows an example of the printer specifying screen 89.

Figure 8D:
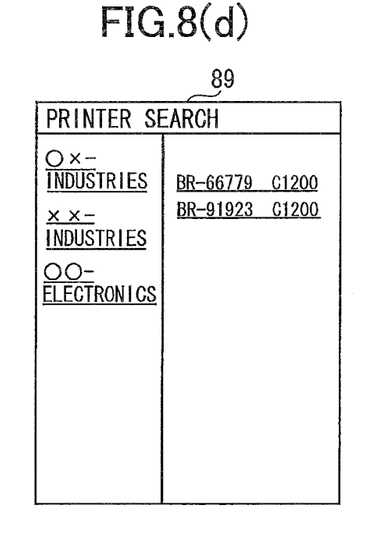

When the number of listed printer IDs becomes relatively small, as on the printer specifying screen 89 shown in FIG. 8(d), then the user confirms the printer ID indicated on or attached to the printer 8, and specifies the printer ID (S131).

When the user specifies the printer ID, the mobile terminal 5 sends the printer ID of the printer 8 to the relay server 3 (S133). The relay server 3 receives the printer ID of the printer 8 from the mobile terminal 5 (S135).

Note that since the process to specify the printer by the user (S131) through the process to execute printing with the printer 8 after the printer ID is sent from the mobile terminal 5 to the relay server 3 are the same as those of the first embodiment (S69 to S93), explanation thereof will be omitted.

As described above, in the second embodiment, the list of the printer IDs of the printers in the print job standby state is displayed, and the printer IDs of the printers not in the print job standby state are not displayed. Therefore, it is possible to narrow down the printer IDs without need of specifying location information in each of the all levels as in the case of the first embodiment. That is, it is possible to reduce the number of narrow-down operations.

While the invention has been described in detail with reference to the embodiments thereof, it would be apparent to those skilled in the art that various changes and modifications may be made therein without departing from the spirit of the invention.

For example, the printers in the printing system 1 are not limited to those located in companies, but may be those at arbitrary locations.

Also, the devices in the printing system 1 of the above embodiments are interconnected with one another via the Internet 11. However, this is not limitation of the invention. The devices may be interconnected within a LAN without the Internet 11.

In the first embodiment, the mobile terminal 5 sequentially displays the search TOP screen 59 and the narrow-down result screens 61 to 69, and then displays the printer specifying screen 71 that shows a list of the printer IDs of the all printers on a floor specified by the user, which is the location information in the lowest level. However, this is not limitation. For example, the mobile terminal 5 may also display printer IDs of candidate printers on each of the search TOP screen 59 and the narrow-down result screens 61 to 69. Specifically, the printer IDs of the all printers located in "Aichi prefecture" specified by the user on the search TOP screen 59 may be displayed on the narrow-down result screen 61 (FIG. 4(*b*)) together with the municipality names, for example.

Also, the printer 8 may not perform the polling for obtaining print jobs. In this case, the following operation may be performed. When the power to the printer 8 is turned ON, the connection for the communication between the relay server 3 and the printer 8 is established. If the user presses the print button 44 of the printer 8, then the printer 8 sends the printer ID and a standby notification indicating the print job standby state to the relay server 3. The relay server 3 records that the printer corresponding to the printer ID received together with the standby notification is in the print job standby state. On the other hand, the printer 8 that has sent the printer ID and the standby notification waits for a print job from the relay server 3. Upon receiving a print job, the relay server 3 sends a corresponding print job to the printer 8 that is waiting for a print job. It is preferable to execute this process in a system where all the printers in the printing system 1 and the relay server 3 are within the LAN 7 and communicable with one another without the Internet 11. This is because it is unnecessary to consider a fire wall of the LAN 7 if the all printers and the relay server 3 are within the LAN 7.

In the embodiments, the printer ID of the printer 8 is displayed in the italic font on the printer specifying screen 73. However, this is not the limitation. For example, the printer ID of the printer 8 may be displayed in a different color than other printer IDs, blinked, or displayed with a prescribed mark appended thereto.

In the first embodiment, the user specifies a document to be printed after specifying a printer. However, the user may specify a printer after specifying a document to be printed. In this case, the following process may be performed. The mobile terminal 5 requests the relay server 3 for the document specifying file 25. The mobile terminal 5 receives the document specifying file 25 and displays the document specifying screen 75. When the user specifies a document by operating the mobile terminal 5, then the mobile terminal 5 sends a local document or a URL of the document to the relay server 3. The relay server 3 sends a printer specifying file for specifying a printer for printing the specified document to the mobile terminal 5. When the user operates the mobile terminal 5 to specify a printer, the relay server 3 sends a print job to the specified printer.

What is claimed is:

1. A server communicable with both a terminal device and a printer, comprising:
    a first command receiving unit that receives a first command from the printer when a user performs a first operation on the printer for executing printing;
    a printer recognizing unit that recognizes the printer as a first printer that is waiting for a print job based on the first command, the first command indicating that the printer is waiting for a print job;
    a file request receiving unit that receives a file request from the terminal device;
    a first file transmitting unit that transmits a first file to the terminal device when the file request receiving unit has received the file request, the first file being a file for displaying on the terminal device a printer specifying screen which includes printer identification information for identifying the first printer;
    a second command receiving unit that receives a second command from the terminal device, the second command being transmitted from the terminal device when the first printer is specified on the printer specifying screen; and
    a job transmitting unit that transmits the print job to the first printer specified by the terminal device when the second command receiving unit has received the second command,
    wherein a plurality of printers are on a network including the terminal device, the printer, and the server, the plurality of printers including the first printer and a second printer that is recognized as not waiting for a print job, and
    wherein the printer specifying screen displays at least the first printer and the second printer in a manner enabling recognition of the first printer as waiting for the print job and recognition of the second printer as not waiting for the print job.

2. The server according to claim 1, further comprising a storage unit that stores a plurality of sets of printer identification information corresponding to the plurality of printers, respectively, wherein:
    the first command includes one set of printer identification information corresponding to the printer that transmits the first command; and
    the first file is a file for displaying on the terminal device the printer specifying screen that includes a list of the plurality of printer identification information sets corresponding to the plurality of printers on the network such that the one printer identification information set included in the first command is displayed differently than other printer identification information sets.

3. The server according to claim 1, wherein:
    the first command is a first job request command with which the printer requests the print job;
    the first command receiving unit receives the first job request command from the printer during a first time period after the first operation has performed until the printer receives the print job;
    the printer recognizing unit recognizes the printer that transmits the first job request command as the first printer; and
    the job transmitting unit transmits the print job in response to the first job request command.

4. The server according to claim 3, further comprising a second job request command receiving unit that receives a second job request command from the first printer that has received the print job, wherein:

the second job request command is a command with which the first printer requests the server for another print job that has not yet been received by the first printer;

the job transmitting unit transmits the another print job to the first printer in response to the second job request command; and the second job request command receiving unit keeps receiving the second job request command from the first printer until the first printer no longer receives a print job from the server in response to the second job request command.

5. The server according to claim 3, wherein if the user has performed a second operation for extending the print job request of the printer within the first time period on the printer on which the first operation has been performed, the first command receiving unit receives the first job request command for a second time period after the first operation has performed, the second time period being longer than the first time period.

6. The server according to claim 1, further comprising:
a second file transmitting unit that transmits a second file in response to the second command to the terminal device, the second file being a file for displaying on the terminal device a job specifying screen on which the print job for instructing the first printer to execute printing is specified; and a job obtaining unit that obtains the print job specified by the terminal device displaying the job specifying screen, wherein:

the job transmitting unit transmits the print job obtained by the job obtaining unit.

7. The server according to claim 1, further comprising a storage unit that stores a plurality of sets of printer identification information corresponding to the plurality of printers, respectively, wherein:

the first file transmitting unit transmits the first file when the file request receiving unit has received the file request, the first file being a file for displaying on the terminal device the printer specifying screen including a list of the plurality of printer identification information sets corresponding to the plurality of printers on the network; and the first file transmitting unit further transmits another first file when the first command receiving unit receives the first command, the another first file being a file for displaying on the terminal device the printer specifying screen including the list of the plurality of printer identification information sets corresponding to the plurality of printers on the network such that the one printer identification information set included in the first command is displayed differently than other printer identification information sets.

8. The server according to claim 1, wherein the first file transmitting unit transmits the first file that includes a refresh request command, the refresh request command being a command that repeatedly instructs update of the printer specifying screen.

9. A non-transitory computer readable storage medium storing a set of program instructions installed on and executed by a server communicable with both a terminal device and a printer, the set of program instructions comprising:

receiving a first command from the printer when a user performs a first operation on the printer for executing printing;

recognizing the printer as a first printer that is waiting for a print job based on the first command, the first command indicating that the printer is waiting for a print job;

receiving a file request from the terminal device;

transmitting a first file to the terminal device when the file request has been received, the first file being a file for displaying on the terminal device a printer specifying screen which includes printer identification information for identifying the first printer;

receiving a second command from the terminal device, the second command being transmitted from the terminal device when the first printer is specified on the printer specifying screen; and transmitting the print job to the first printer specified by the terminal device when the second command has been received, wherein a plurality of printers are on a network including the terminal device, the printer, and the server, the plurality of printers including the first printer and a second printer that is recognized as not waiting for a print job, and wherein the printer specifying screen that displays at least the first printer and the second printer in a manner enabling recognition of the first printer as waiting for the print job and recognition of the second printer as not waiting for the print job.

10. A printing system comprising:
a printer including a first command transmitting unit and a job receiving unit;

a terminal device including a file request transmitting unit, a file receiving unit, and a second command transmitting unit; and a server communicable with both the terminal device and the printer, and including a first command receiving unit, a printer recognizing unit, a file request receiving unit, a first file transmitting unit, a second command receiving unit, and a job transmitting unit, wherein:

the first command transmitting unit transmits a first command to the server when a user performs a first operation on the printer for executing printing, the first command indicating that the printer is waiting for a print job;

the first command receiving unit receives the first command from the printer;

the printer recognizing unit recognizes the printer as a first printer that is waiting for a print job based on the first command;

the file request transmitting unit transmits a file request to the printer;

the file request receiving unit receives the file request from the terminal device;

the first file transmitting unit transmits a first file to the terminal device when the file request receiving unit has received the file request, the first file being a file for displaying on the terminal device a printer specifying screen which includes printer identification information for identifying the first printer;

the file receiving unit receives the first file, the terminal device displaying the printer specifying screen based on the first file;

the second command transmitting unit transmits a second command to the server when the first printer is specified on the printer specifying screen;

the second command receiving unit receives the second command from the terminal device;

the job transmitting unit transmits the print job to the first printer specified by the terminal device when the second command receiving unit has received the second command; and the job receiving unit receives the print job from the server, wherein a plurality of printers are on a network including the terminal device, the printer, and the server, the plurality of printers including the first printer and a second printer that is recognized as not waiting for a print job, and wherein the printer specifying screen that displays at least the first printer and the second printer in a manner enabling recognition of the first printer as waiting for the print job and recognition of the second printer as not waiting for the print job.

* * * * *